Nov. 19, 1929.　　　L. ROSENFELD　　　1,736,626
MILK COOLER
Filed May 21, 1928　　　2 Sheets-Sheet 1
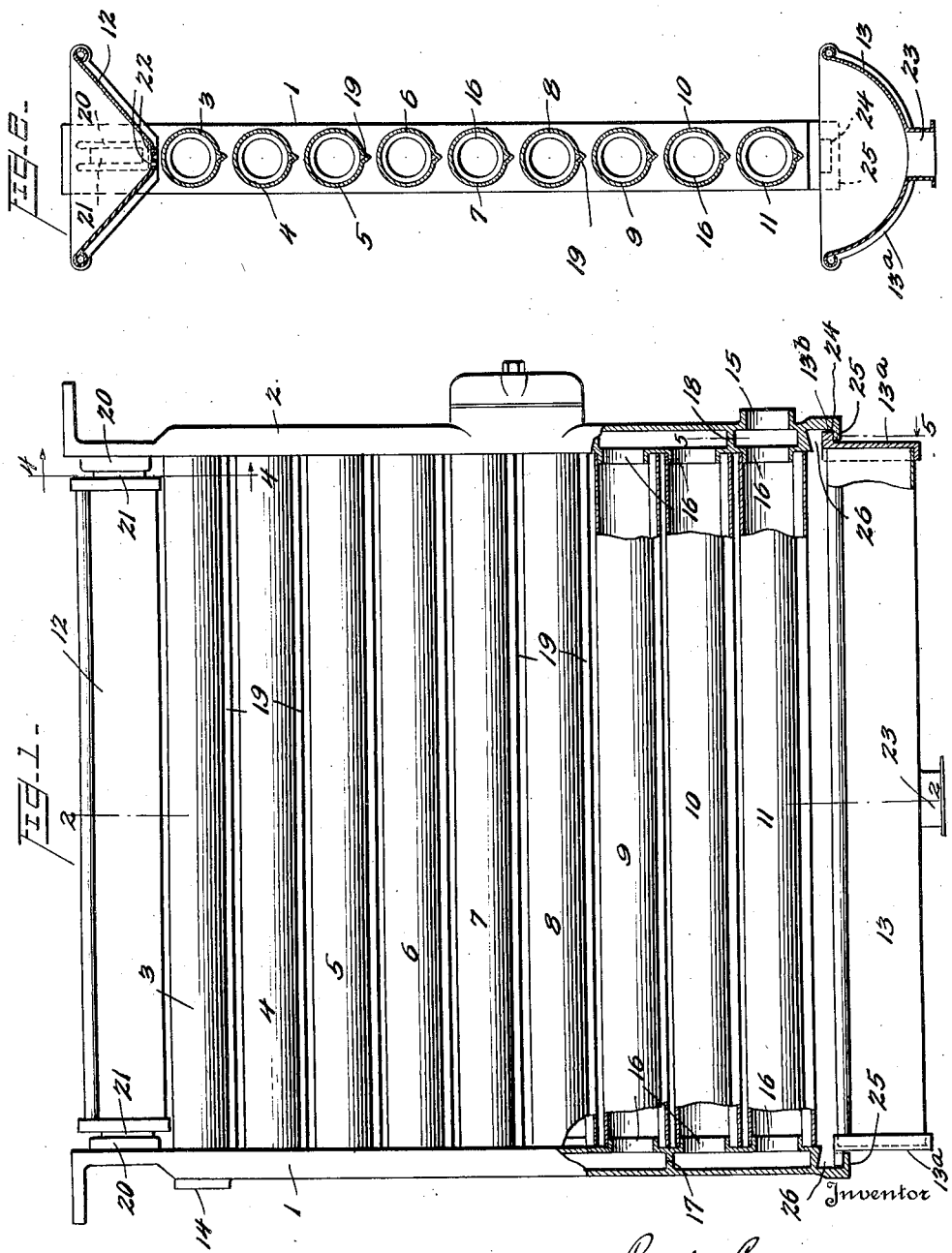

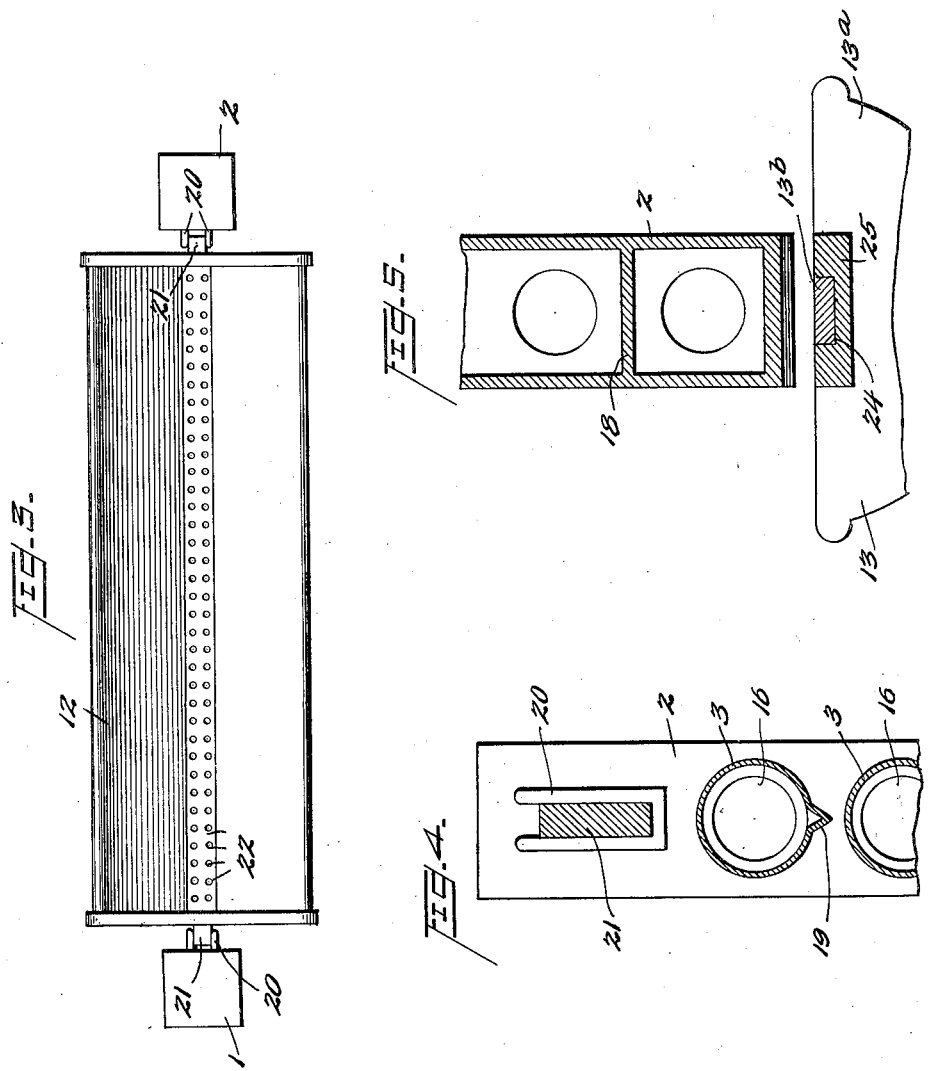

Patented Nov. 19, 1929

1,736,626

UNITED STATES PATENT OFFICE

LOUIS ROSENFELD, OF BALTIMORE, MARYLAND, ASSIGNOR, BY MESNE ASSIGNMENTS, TO CHERRY-BURRELL CORPORATION, A CORPORATION OF DELAWARE

MILK COOLER

Application filed May 21, 1928. Serial No. 279,325.

This invention relates to milk coolers of the type comprising a pair of vertically arranged headers with tubes for the cooling liquid arranged one above the other and connected in series by the headers. The purpose of the invention is to provide means whereby the operation of soldering the tubes to the headers is simplified, and also to provide means whereby the water condensing on the headers will not pass into the pan which receives the milk from the cooling tubes.

In the accompanying drawing,

Fig. 1 is a side elevation of the complete cooler, partly in section;

Fig. 2 is a vertical section on the line 2—2 of Fig. 1;

Fig. 3 is a top plan view of the cooler;

Fig. 4 is a section on the line 4—4 of Fig. 1; and,

Fig. 5 is a section on the line 5—5 of Fig. 1.

The cooler comprises a pair of upright hollow headers 1 and 2, connected together by a vertical series of tubes 3–11, inclusive. Above the uppermost tube 3 is arranged a trough 12, into which the milk to be cooled is poured, and below the lowermost tube 11 is arranged a drip pan 13, adapted to receive the milk as it drips from the lowermost tube. The header 1 is provided with an inlet opening 14, to which a pipe may be connected for conveying the cooling liquid to the cooler. The header 2 is provided with an outlet opening 15, from which the cooling liquid may escape into a discharge pipe. The headers on their adjacent faces are provided with tubular bosses 16, and the ends of the tubes fit around these bosses and are soldered thereto, so as to make liquid-tight joints with the headers. Within the headers are arranged partitions, such as 17 and 18, which divide the headers into compartments for directing the cooling liquid through the tubes in series from the inlet opening 14 to the outlet opening 15. Each tube has a fin 19, extending along its lower side, the purpose of this fin being to cause the milk which flows around the outer side of the tube to drip on to the top of the next tube below it. These fins or ribs are formed by pressing out the walls of the tubes.

The upper ends of the headers are provided on their inner sides with sockets 20, and the trough 12 is provided on its ends with projections 21, adapted to fit within these sockets. Thus, the trough may be readily removed or replaced. This trough extends close to the uppermost tube 3, and the bottom of the trough is provided with rows of fine perforations 22, to permit the milk to drip on to the tube throughout its length. The trough is made of sheet metal, and in making the perforations, the metal is indented and pressed downwardly, as shown in Fig. 2, forming dripping points to direct the milk on to the tube below and prevent it from running over the lower surface of the trough.

The pan 13, which receives the milk from the lowermost tube, is provided with a central outlet 23, through which the milk may flow from the cooler to cans or other receptacles. The ends 13ª of the pan 13 are provided at their upper edges and near their central portions with outwardly projecting lugs 13ᵇ, which are adapted to fit within recesses 24 in flanges 25, at the lower ends of the headers. These flanges are formed by recessing the inner faces of the headers, as shown at 26. These flanges project toward one another, and it will be seen that the ends of the drip pan are at the inner sides of the headers. The purpose of arranging the ends of the drip pan between the headers is to prevent moisture which condenses on the headers from dripping into the pan. If the pan extended beyond the headers, the water of condensation would drip into the pan.

In operation, the cooling liquid will be admitted through the opening 14 and will pass out through the opening 15, although this direction of liquid flow may, of course, be reversed. The cooling liquid will flow in series through the tubes and the milk, distributed from the trough 12 over the uppermost cooling tube, will drip from tube to tube until it reaches the last tube, when it will drip into the pan 13 and pass out through the opening 23. By providing the bosses 16 on the inner sides of the headers, the work of soldering the tubes to the headers is made much easier than where the tubes extend into sockets in the headers, as has been customary.

What I claim is:

A milk cooler comprising two opposed upright hollow headers and a plurality of tubes connected in series by the headers, said cooler having openings for the inlet and outlet of cooling fluid, said headers having flanges at their lower ends projecting toward one another, and a drip pan having outwardly projecting lugs, said flanges having sockets to receive said lugs.

In testimony whereof I hereunto affix my signature.

LOUIS ROSENFELD.